(12) United States Patent
Grundvig et al.

(10) Patent No.: US 8,925,957 B2
(45) Date of Patent: Jan. 6, 2015

(54) FOLDABLE VALET CART

(76) Inventors: Willis Grundvig, Lakewood, CO (US); Gertrude Davis, Colorado Springs, CO (US)

( * ) Notice: Subject to any disclaimer, the term of this patent is extended or adjusted under 35 U.S.C. 154(b) by 0 days.

(21) Appl. No.: 13/354,104

(22) Filed: Jan. 19, 2012

(65) Prior Publication Data

US 2012/0235386 A1    Sep. 20, 2012

Related U.S. Application Data

(60) Provisional application No. 61/434,646, filed on Jan. 20, 2011.

(51) Int. Cl.
*B62B 3/02* (2006.01)
*B62B 3/12* (2006.01)

(52) U.S. Cl.
CPC ... *B62B 3/02* (2013.01); *B62B 3/12* (2013.01); *B62B 2202/24* (2013.01); *B62B 2202/65* (2013.01); *B62B 2205/12* (2013.01)
USPC ............................................ 280/651; 280/39

(58) Field of Classification Search
CPC ............ B62B 3/00; B62B 3/02; B62B 3/022; B62B 3/106; B62B 3/12; B62B 5/065; B62B 2301/14
USPC ............... 280/38, 39, 42, 651, 652, 654, 655, 280/639, 646
See application file for complete search history.

(56) References Cited

U.S. PATENT DOCUMENTS

| | | | | |
|---|---|---|---|---|
| 2,574,232 A | * | 11/1951 | Welsh | 280/42 |
| 3,102,648 A | * | 9/1963 | Hughes | 414/449 |
| 3,168,329 A | * | 2/1965 | Goldschmidt | 280/651 |
| 3,987,863 A | * | 10/1976 | Mittendorf et al. | 180/68.6 |
| 4,033,246 A | * | 7/1977 | Jentoft et al. | 454/357 |
| 4,051,322 A | * | 9/1977 | Park et al. | 174/664 |
| 4,274,644 A | * | 6/1981 | Taylor | 280/39 |
| 4,505,495 A | * | 3/1985 | Foss et al. | 280/651 |
| 5,971,653 A | * | 10/1999 | Harpell | 403/97 |
| 6,113,129 A | * | 9/2000 | Marques et al. | 280/654 |
| 7,819,409 B2 | * | 10/2010 | Chang | 280/47.371 |
| 2005/0258621 A1 | * | 11/2005 | Johnson et al. | 280/651 |
| 2010/0066057 A1 | * | 3/2010 | Jian | 280/639 |
| 2010/0117336 A1 | * | 5/2010 | Yang | 280/639 |

* cited by examiner

*Primary Examiner* — Frank Vanaman
(74) *Attorney, Agent, or Firm* — Blakely Sokoloff Taylor & Zafman LLP

(57) ABSTRACT

A foldable valet cart is described. In one example, the valet cart includes a base frame, plurality of wheels coupled to the base frame, a lower vertical support frame pivotally connected to the base frame to fold against the base frame, an upper vertical support frame pivotally connected to the lower vertical support frame opposite the base frame to fold against the lower vertical support frame, and a hanger rod pivotally connected to the upper vertical support frame opposite the lower vertical support frame to fold against the upper vertical support frame.

16 Claims, 14 Drawing Sheets

US 8,925,957 B2

FOLDABLE VALET CART

CROSS-REFERENCE TO RELATED APPLICATIONS

This application claims the priority of prior U.S. Provisional Patent Application Ser. No. 61/434,646, filed Jan. 20, 2011, entitled FOLDABLE VALET CART.

FIELD

The present disclosure relates to the field of foldable hand trucks, carts, and dollies, and in particular, to a such a device with pivoting parts that fold against each other.

BACKGROUND

In travel and mobile productions and operations, it is often necessary to move large or heavy packages and items. A variety of hand trucks, luggage carts, trolleys, valets, and other wheeled carriers have been developed to assist people in handling large and heavy items. In all such carts, greater weight and size allows the cart to more easily carry more and heavier items. At the same time lighter, smaller carts are easier to pack, store, and transport when not in use.

To allow a cart to be useful, compact and portable, a variety of different folding and collapsible hand trucks, light wagons, and other types of carts have been developed. By folding or collapsing the cart, it can be packed for easier transport when not in use. Folding and collapsible designs, however, take some time to fold and unfold and offer less strength than carts that are rigid. There are, for example, a variety of small carts for carrying airplane luggage that can be folded up to fit beside the luggage or stored in an airplane's overhead storage compartment but these folding carts are all small and weak.

While a hand truck or dolly can be folded fairly flat by simply folding up its base, other types of carts are more complex. A particularly difficult cart to fold is known as a valet, valet cart, valet truck, bell man's cart, hotel luggage cart, or by similar names. Such a cart features high rods or hooks to hang clothes hangers and garment bags. The clothes hanger is designed to be high enough to allow clothing to be fully suspended off the ground and the bottom of the cart. The clothes hanger also requires enough supporting structure to carry the clothes. The combination of height and strength makes such a cart difficult to fold or collapse.

BRIEF SUMMARY

A foldable valet cart is described. In one example, the valet cart includes a base frame, plurality of wheels coupled to the base frame, a lower vertical support frame pivotally connected to the base frame to fold against the base frame, an upper vertical support frame pivotally connected to the lower vertical support frame opposite the base frame to fold against the lower vertical support frame, and a hanger rod pivotally connected to the upper vertical support frame opposite the lower vertical support frame to fold against the upper vertical support frame.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
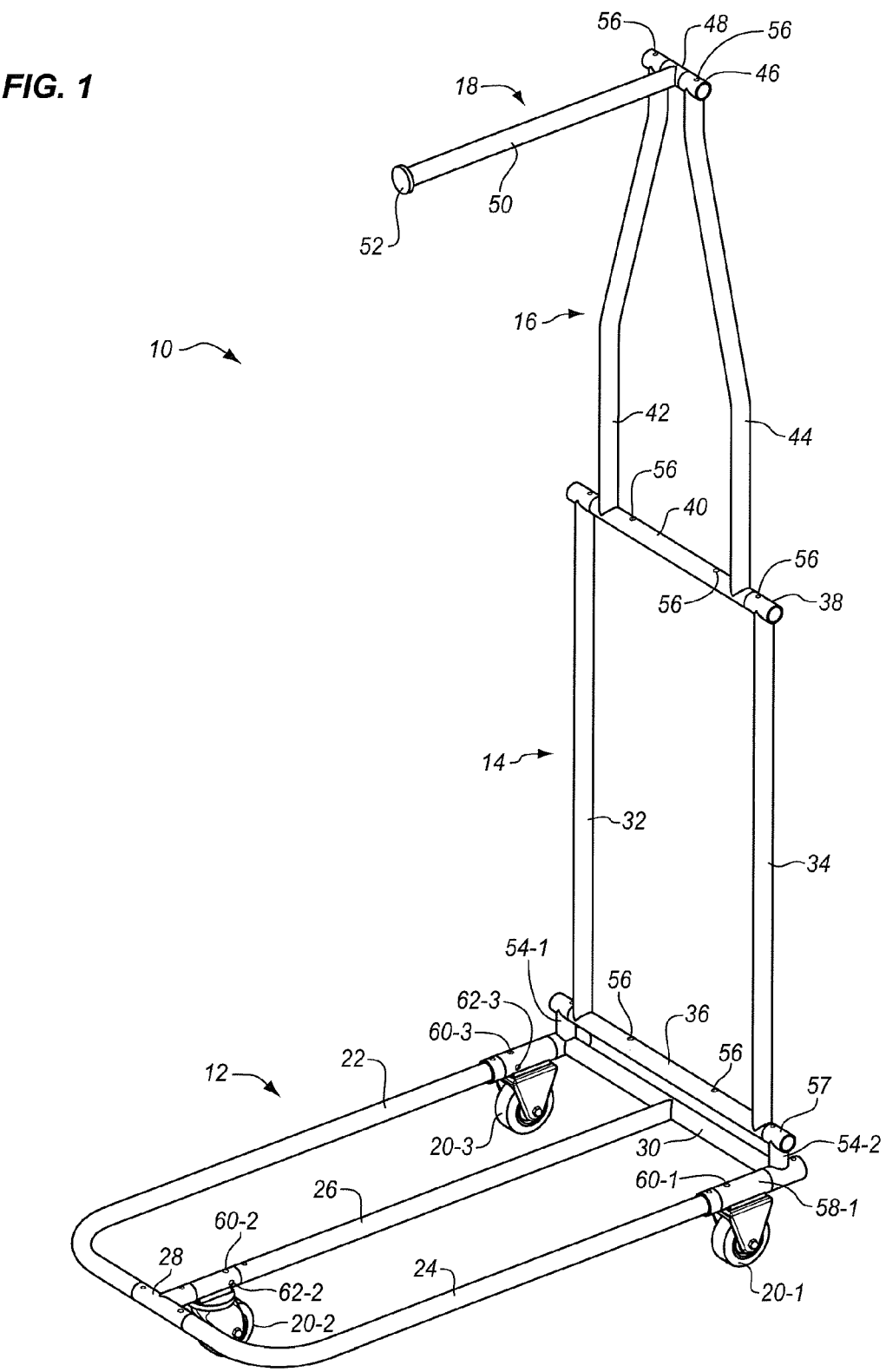
FIG. 1 shows a perspective view of a valet cart in an unfolded position according to an embodiment of the present invention.

FIG. 1 shows a perspective view of a valet cart according to one embodiment of the present invention, the cart 10 has a base 12 base to support the cart, a vertical support frame, with a lower part 14 and an upper part 16 and a hanger rod 18. The base frame 12 has a pair of side rails 22, 24 on either side of a center rail 26. The side rails and center rail are parallel to each other and both connected at one end to a back rail 3. At the front of the cart, the two side rails 22, 24 curve around to meet at a front connector 28 attached to the center rail 26. While the illustrated example is curved a more squared or angular shape to the front of the side rails may be used as an alternative.

While the base 12 in the present example is shown as having three side rails, a back rail and a front, a variety of other configurations can be used. For example there may be a front rail to connect the rails together. The center rail may be removed. The two side rails may be arranged to meet using a different shape or configuration. Alternatively, additional rails may be added to the base 12, for additional support to suit any particular application.

The support frame has a lower support frame 14 with two vertical support rails 32, 34 which are connected along a bottom horizontal rail 36. The tops of the two support rails are connected by a top rail 38. The upper support frame 16 has two vertical support rails 42, 44 which are connected at their bottoms by a horizontal rail 40, and at the top by another horizontal rail 56. The hanger rod 18 is connected to the top of the upper vertical support frame 16 at its base 48. The opposite end of the hanger rod has a hanger stop or end cap 52. A hanger rod 50 connects the end cap to the attachment to the upper vertical frame 48.

As can be seen in the illustration of FIG. 1 the base frame 12 provides a surface onto which packages of any sort can be placed. The vertical support frame provides a support for the hanger rod 18 which can be used to hang clothes, garment bags, or any other desired equipment.

The entire cart can be moved around on a set of wheels 20. The wheels are attached to the base frame 12. In the illustrated example, one wheel is attached to each rail. In other words, the right side rail 22 has a wheel 20-3, the left side rail 24 has a wheel 20-1 and the center rail 26 has a wheel 20-2. As shown in this example, the wheels on the outer side rails 20-1, 20-3 are attached at the back of the cart closest to the vertical support frame while the wheel on the center rail 20-2 is attached at the front of the cart. This provides a three point support for the cart that is inherently stable and easy to steer. In one example the front wheel 20-2 on the center rail 26 pivots while the two back wheels 20-1, 20-3 do not. Other wheel configurations may be used as alternatives. For example, four wheels may be used with two attached at the front to the side rails.

The base frame at its rear rail 30 is coupled to the vertical support frame. In particular, the lower rail 36 of the vertical support frame is attached to the rear rail 30 of the base frame by vertical supports 54-1, 54-2. The back rail of the base frame is parallel to the bottom rail of the vertical support frame 36. The vertical support posts 54 stand off from the side rails 22, 24 of the base frame and raise the bottom rail 36 of the lower vertical support frame up from the base frame by an amount that is greater than the diameter of both the bottom rail 36 of the vertical support frame and the back rail 30 of the base frame. An outer tube 57 is attached to both of the support posts 54 to hold the bottom rail 36 of the vertical support frame. The bottom rail 36 can rotate about the outer tube 57 to allow the vertical support frame to pivot with respect to the base frame 12.

Figure 5:
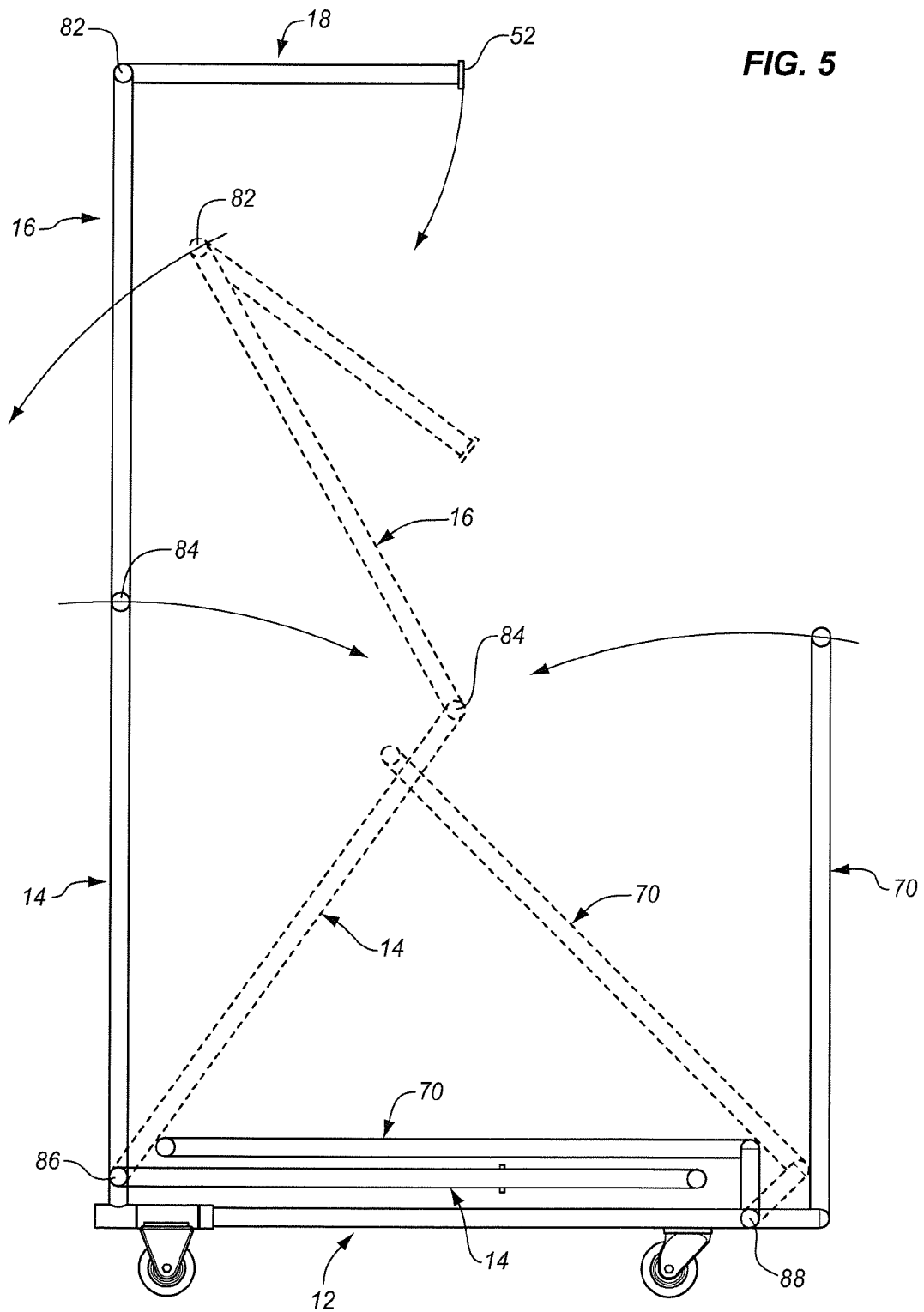
FIG. 5 shows a side elevation view of the pivoting and folding of the valet cart of FIG. 2 according to an embodiment of the invention.

Similarly the top of the lower part of the vertical support frame 14 has an outer tube 38 to hold the lower rail 40 of the upper support frame 16. The lower rail of the upper support frame can pivot about this tube 38. In a similar fashion, the top rail 46 of the upper vertical support frame acts as a tube to hold the back end of the hanger rod 48. The hanger rod 48 can then rotate about the top rail 46 of the upper support frame. As shown in FIG. 5 these pivot connections allow the cart to be folded into a more compact form.

Figure 2:
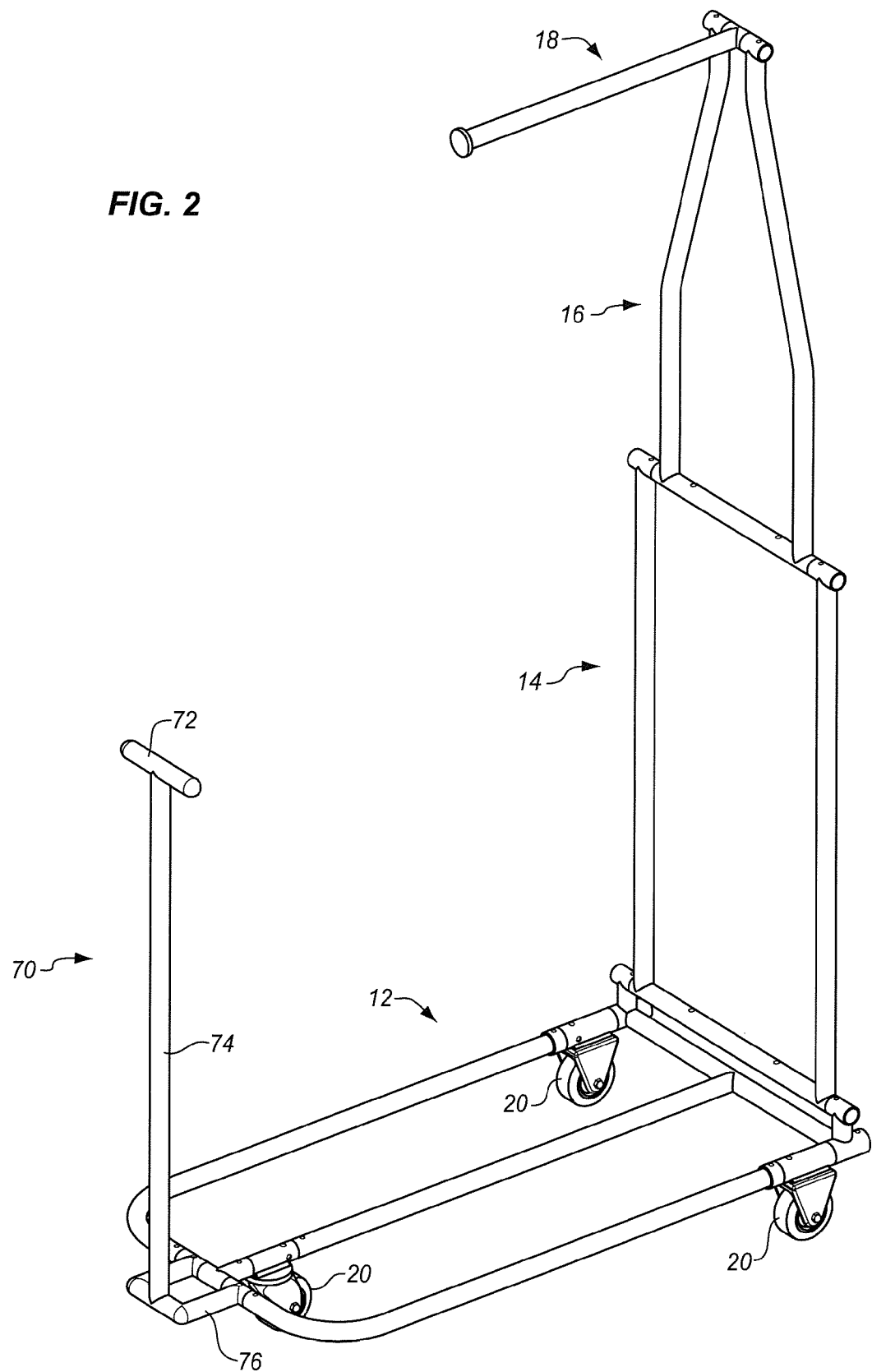
FIG. 2 shows a perspective view of an alternative valet cart in an unfolded position according to an embodiment of the present invention.

FIG. 2 shows an alternative configuration to the valet cart of FIG. 1, in FIG. 2 the valet cart has a base frame 12, a lower vertical support frame 14, an upper vertical support frame 16, a hanger rod 18, and wheels 20. However, the front of the base frame 12 is adapted to carry a handle 70. The handle has a support rod 74 extending from the base frame up to a T-bar grip 72 at the end of the support rod 74. At the bottom of the support rod opposite the T-bar grip is a bracket 76 to support the handle. The bracket attaches between the vertical support rod and the base frame 12 to hold the handle in place. The handle can be used to move the cart, to tow the cart and also to retain items placed on top of the base frame 12.

Figure 3:
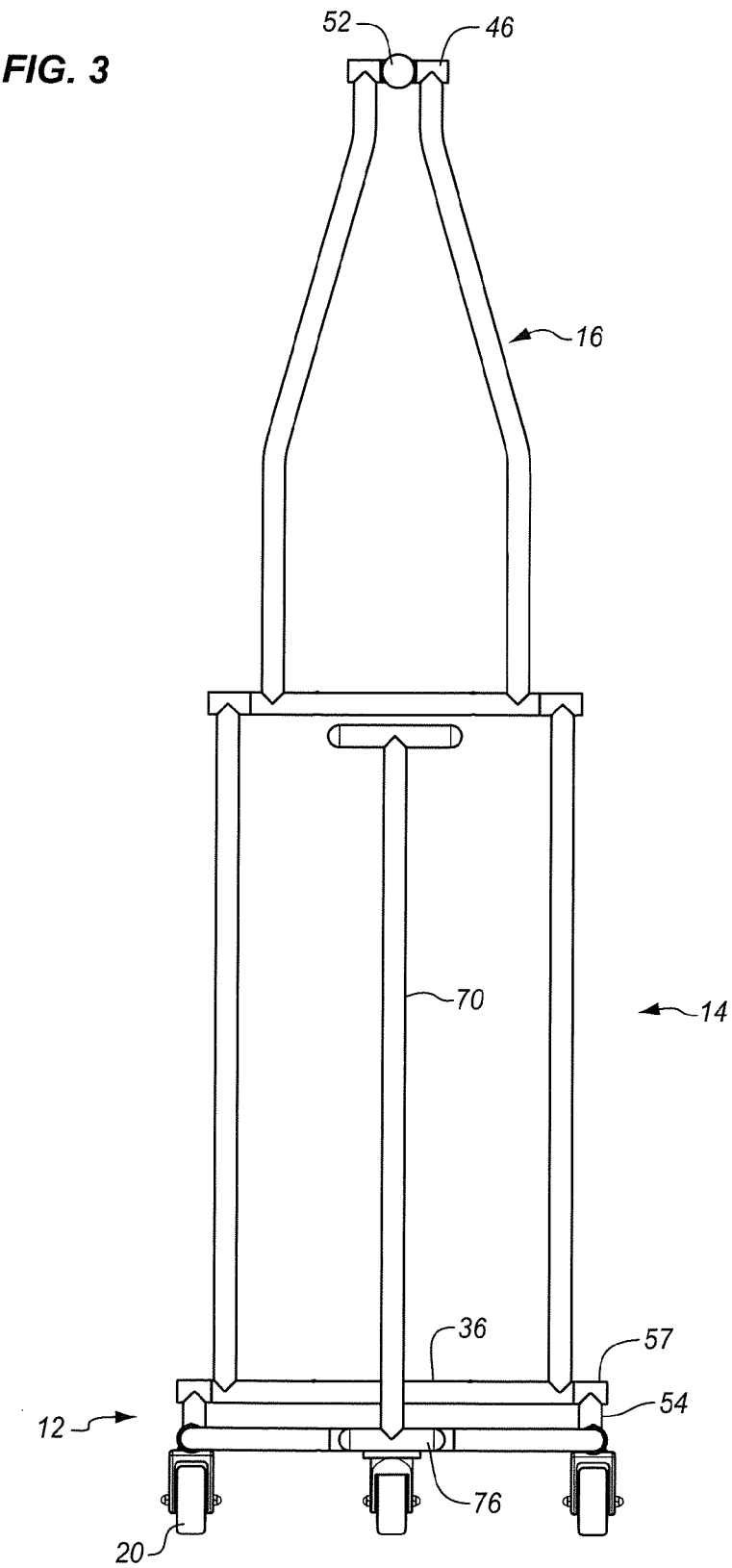
FIG. 3 shows a front elevation view of the valet cart of FIG. 2 according to an embodiment of the invention.

FIG. 3 shows the valet cart in a front elevation view. As can be seen in FIG. 3, the base frame 12 is at a lowest level directly above the wheels 20. The bottom of the upper frame, that is the lower rail 36 of the lower vertical support frame 14 is on a second level raised above the base frame by the vertical supports 54. As the vertical support frame pivots about its lower rail 36 it will always be spaced up above the base frame 12.

Figure 4:
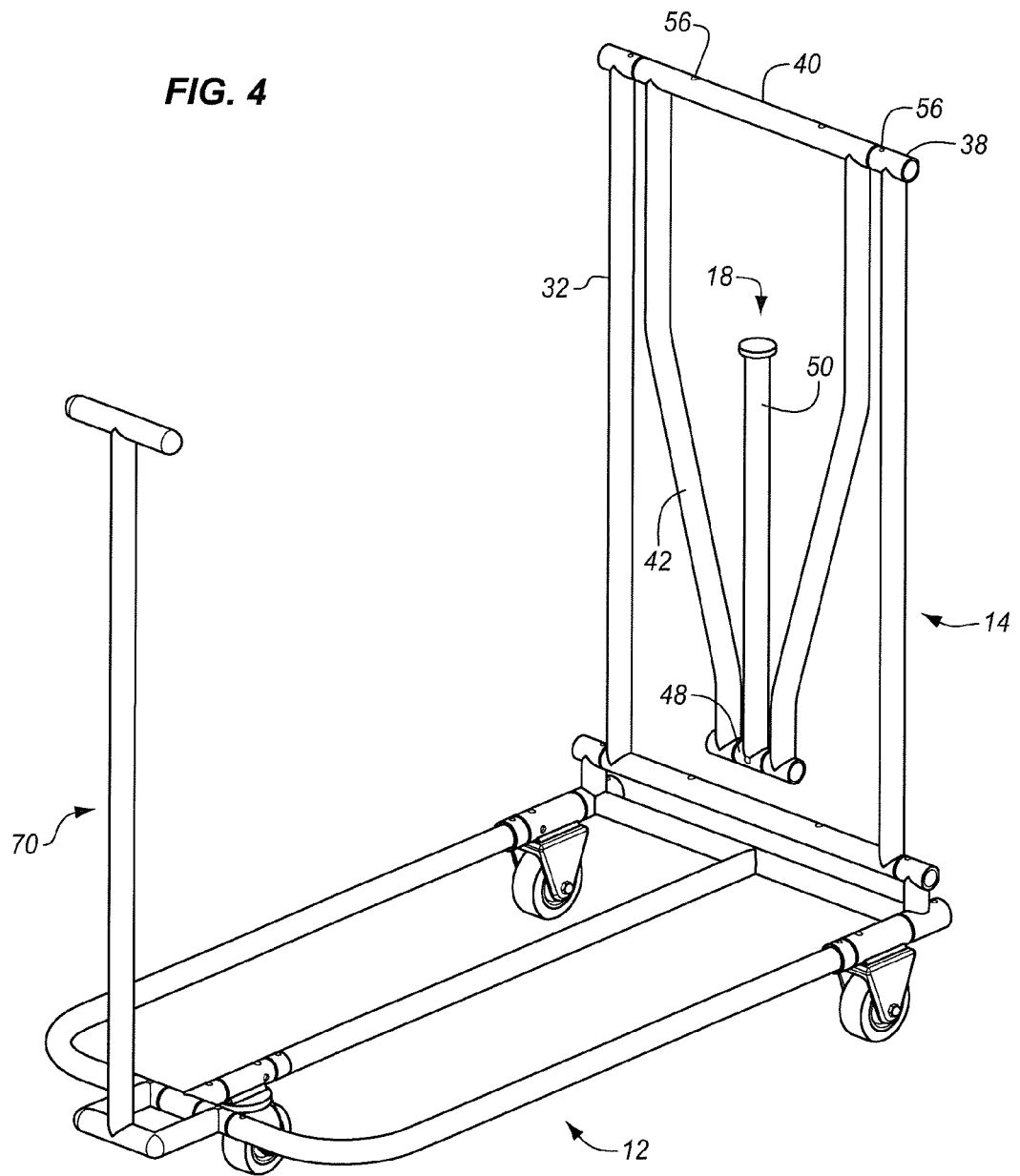
FIG. 4 shows a perspective view of the valet cart of FIG. 2 with the hanger bar folded down according to an embodiment of the invention.

FIG. 4 shows the valet cart of FIG. 2 with the hanger rod 18 folded into the upper vertical support frame 16 and the upper vertical support frame 16 folded into the lower vertical support frame 14. In FIG. 4, the hanger rod has been rotated about its end 48 to rest parallel with and encompassed by the upper vertical support frame. The upper vertical support frame has then been folded to be parallel with and encompassed by the upper vertical support frame 14. These three pieces then lie flat with respect to each other for a more compact configuration. In this configuration, the luggage cart can still be used. The top rail of the lower support frame 40 can be used as a handle to push the cart around. This surface may be equipped with rubber grips (not shown) or some other surface for comfort and for a more secure grip on the rail. In addition the optional front handle 70 can be used to move the cart. This front handle can also be equipped with some kind of gripping surface for comfort and usability.

Folding down the hanger rod and the upper part of the vertical support frame as shown makes the cart easier to maneuver and easier to move under low hanging obstacles or to push into a low ceiling storage area. In addition, the upper support frame and hanger rod provide additional surface area on the back wall of the cart. This can be used to better secure packages and equipment onto the base frame of the cart so that the packages do not fall off the back of the cart.

FIG. 5 is a side elevation view to show the pivoting, folding action of the luggage cart of FIG. 2 in more detail. FIG. 5 demonstrates the luggage cart in solid line both in a completely opened and a completely folded configuration. The hanger rod 18 pivots about a point 82 at one end opposite its end cap 52. The hanger rod pivots with respect to the upper support frame 16. The upper support frame 16 has a pivotal connection 84 with the lower support frame 14. As shown in the drawing, the hanger rod 18 can be rotated clockwise to fold toward the upper support rod 16. The upper support rod 16 can be rotated counterclockwise about its pivot point 84 with the lower support rod 14. The lower support rod 14 can be rotated clockwise about a pivot point with the base frame 12, 86. In this way the entire vertical support and hanger rod can be folded flat to lie near the base frame 12 as shown.

In addition, the front handle 70 rotates about a pivotal connection 88 of its bracket with the base frame which allows it to be rotated counterclockwise over the vertical support and hanger rod. The support rod of the handle connects to the bottom bracket of the handle at a distance from the pivot point. This distance offsets the support rod from the pivotal connection enough to allow the support rod, when folded, to be above the vertical support frame. The offset is selected to provide sufficient clearance to accommodate the vertical support frame. As mentioned above, when folded, the base frame 12 forms a first layer. The vertical support and hanger rod form a second layer above the base frame. The front handle 70 forms a third layer above that. With these three layers, the luggage cart forms a compact package which can easily be folded for storage and for transport.

As an alternative, the offset provided by the bracket of the front handle can be reduced or eliminated so that, when folded, the handle rests parallel with, or encompassed by, the side rails of the base frame 12. In the illustrated example, the handle could not be folded because it would be blocked by the center rail of the base frame. However, as mentioned above, the center rail may be removed from the cart or reconfigured to accommodate the handle. In one example, the center rail may be modified as two center rails with sufficient space between the two center rails to accommodate the handle.

Figure 6:
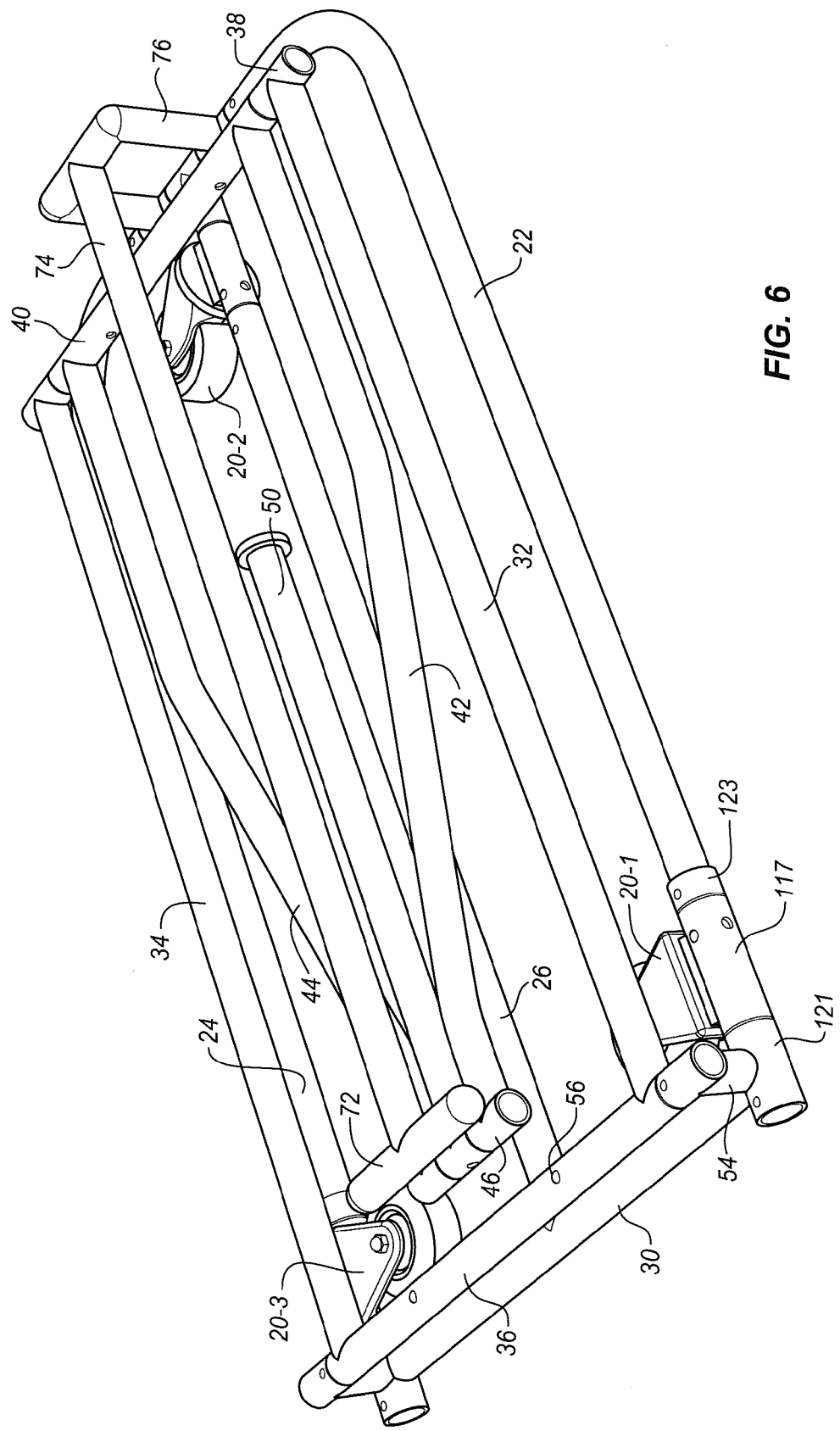
FIG. 6 shows a perspective view of the valet cart of FIG. 2 in a folded position according to an embodiment of the invention.

FIG. 6 is a perspective view of the luggage cart of FIG. 2 in the folded configuration. This folding can be done by moving the rails of the cart as shown by dotted lines in FIG. 5. In the folded configuration, all three levels are seen, one for the base frame 12, one for the vertical support 14,16 and one for the handle 70. In addition, the wheels 20 can be rotated about the rails upon which they are mounted in order to tuck inside of the side rails of the base frame. The wheels are therefore encompassed within the base frame for an even more compact shape.

Figure 7:
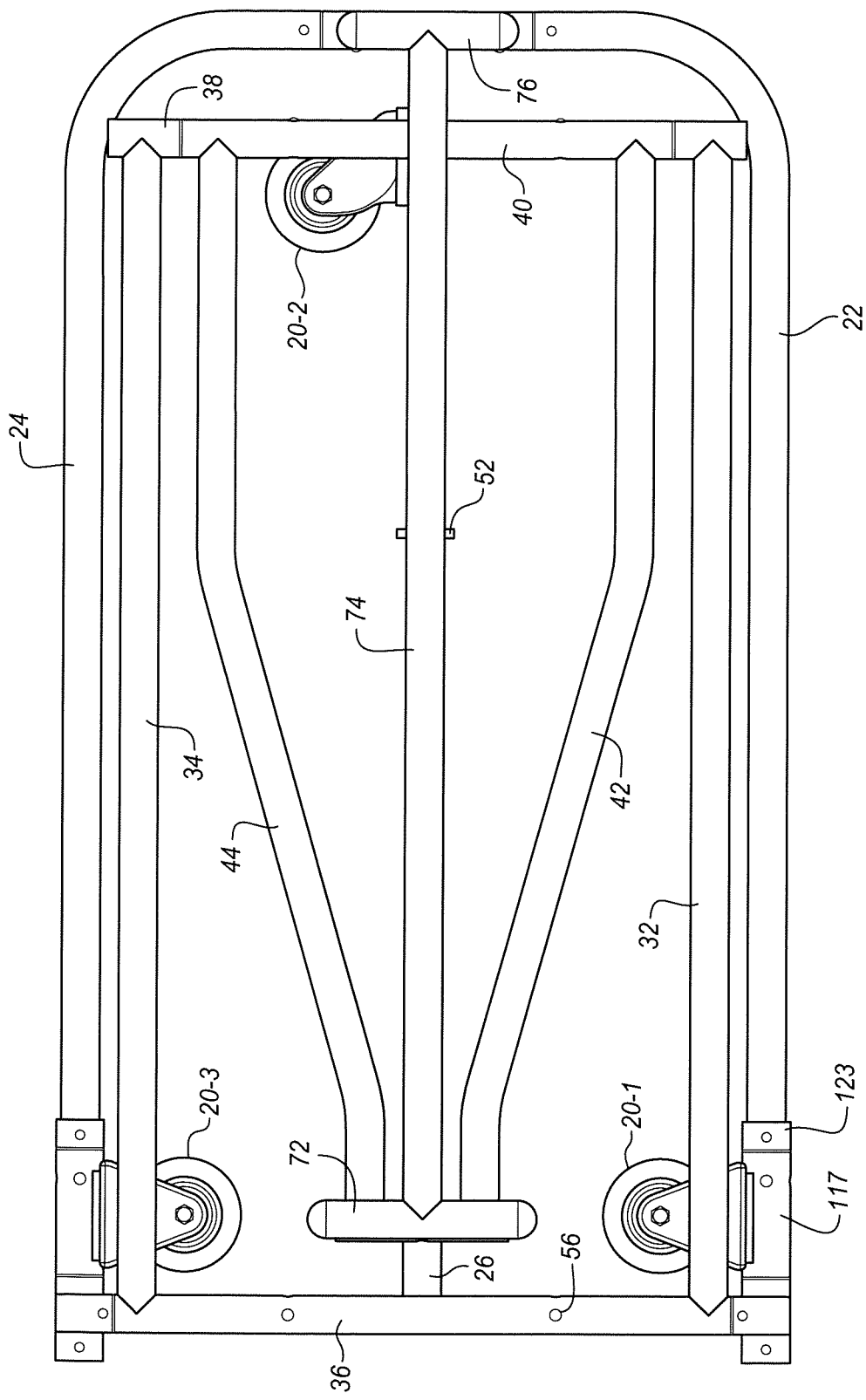
FIG. 7 shows a top elevation view of the valet cart of FIG. 2 in the folded position of FIG. 6 according to an embodiment of the invention.

FIG. 7 is a top elevation view of the folded luggage cart of FIG. 6 in the same folded configuration. Here it can be more easily seen that the wheels have been folded to lie within the perimeter of the base frame and that the vertical support frame, hanger, and handle also lie within the perimeter defined by the base frame 12.

Figure 8:
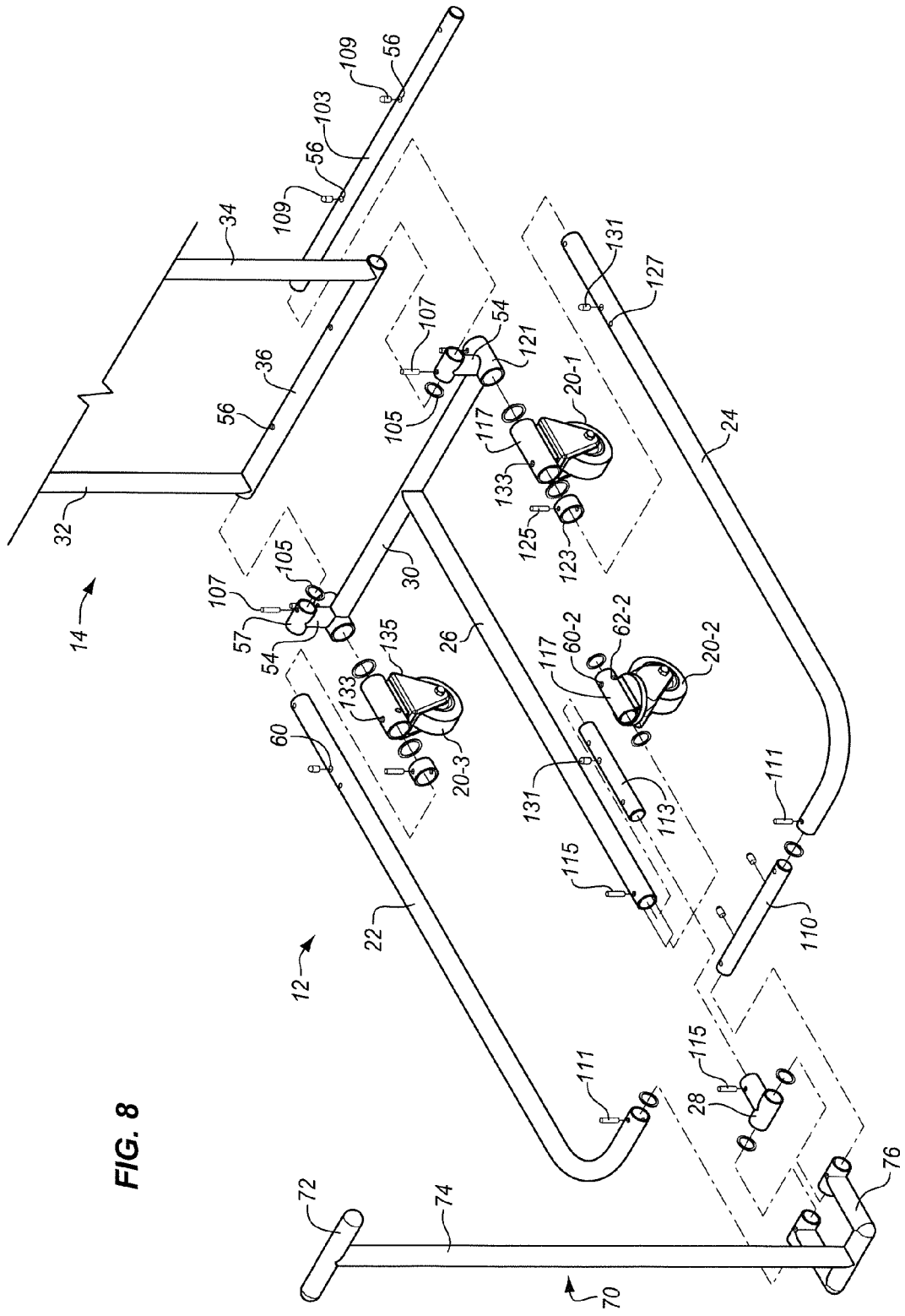
FIG. 8 shows an exploded perspective view of a lower portion of the valet cart of FIG. 2 according to an embodiment of the invention.

FIG. 8 is an exploded view of the cart of FIG. 2 to show how a foldable luggage cart can be made very compact using concentric tubing. The base frame 12, as shown in FIG. 8, is coupled to the lower vertical support frame 14 and to the handle 70 using concentric tubing. The wheels are also coupled to the side rails of the base frame using concentric tubing. Referring to FIG. 8, the back rail 30 of the base frame is connected to two vertical supports 54 which hold rotating fixed sleeves 57 at a distance above the back rail 30. An inner tube 103 slides through the outer sleeves 54 and also carries the bottom rail 36 of the lower vertical support frame 14.

As shown in FIG. 8, the inner sleeve 103 slides into the bottom rail 36 and also into the two upper sleeves 57 of the base frame. The bottom rail 36 can then pivot with respect to the inner tube 103 to provide the folding motions described above. A pair of washers 105 on either side of the bottom rail 36 reduce friction between the bottom rail and the upper sleeves. The washers may be made of aluminum or stainless steel or a similar metal for durability or of a smooth or slippery material, such as PTFE (Polytetrafluoroethylene). Alternatively, the washers may be coated with an oil or permanent lubricant such as PTFE, or the like.

A number of holes 56 are provided in the bottom rail, the upper sleeves, and the inner tube to hold the various pieces in position. A pair of outer pins 107 hold the inner tube 103 in a fixed position with respect to the upper sleeves. Similarly, a pair of inner pins 109 hold the lower rail 36 of the vertical support frame in position with respect to the inner tube 103.

In order to rotate the vertical support frame about the base frame either the inner pins 107 can be released to allow the inner tube and support frame to rotate together about the sleeves or the inner pins 109 may be removed to allow the vertical support frame to rotate about the inner tube and the upper sleeves. The pins can be provided in a variety of different forms depending on the particular application. Either the inner pins or outer pins may be fixed or replaced with some other kind of ridged attachment such as welding, soldering, or a single piece construction in which the inner tube is either a part of the upper vertical support frame or part of the base frame depending on the application. In one example, ball-lock pins may be used. Alternatively, quick release pins, or locking sleeves with pins may be used. Electric solenoid pins may be used for a remote powered actuation. Any other type of locking mechanism may be used depending on the particular application.

At the front of the base frame 12, the two side rails 22, 24 come together at a front connector 28. In the example of FIG. 8, an inner sleeve 110 is fastened to each of the side frame rails 22, 24 using connecting pins 111. These connecting pins may be replaced for example by welds or solid castings or any other desired structure. The inner tube 110 passes through the front connector 28 of the base frame and also through the base 76 of the handle 70. The front connector 28 holds the handle in place with respect to the base frame and the inner tube allows the entire handle to pivot about the base frame. This pivotal connection allows the handle to fold against the base frame as shown, for example, in FIGS. 4, 5, and 6.

In the example of FIG. 8, the front connector 28 is fastened to the center rail 26 also by an inner tube 113 held in place by a pair of pins 115. This tube is not designed to provide any motion or pivotal connection, although pivotal motion could be allowed if the pins were not attached. The illustrated example does not show any mechanism for locking the handle in either the upright or closed position similar to the locking pins 107 and 109 at the back rail of the base frame. However, removable locking pins or any of a variety of other structures may be provided to hold the handle in place, depending on the particular application.

A similar approach may be used to allow the wheels 20 to rotate with respect to the rails upon which they are mounted. Referring for example to the left side rail 24 and the first wheel 20-1, it is mounted to a wheel sleeve 117 which slides over the side rail 24. The side rail fastens to the back rail 30 using a concentric tube configuration. The side rail slides into a sleeve 121 fastened to the back rail. The wheel slides over the side rail. The wheel sleeve 117 slides over the side rail 24 and is held in position towards the back of the side rail by a fixing collar 123. As shown the fixing collar is held in place on the side rail by a pin 125 that extends through the fixing collar into a hole 127 in the side rail. The wheel sleeve 117 is then fixed between the fixing collar 123 and the back rail sleeve 121. The wheel sleeve 117 is able to rotate about the side rail between the fixing collar and the back rail sleeve. As with the upper vertical support and the handle, washers are used to prevent the wheel sleeve from binding against neighboring parts.

The wheel sleeve 117 can be locked in position on the side rail of the base frame using a further pin 131. As can be better seen with respect to the right side frame rail 22 and wheel 20-3. The wheel sleeve has two holes 133, 135. The first hole can be used with a first pin 131 to hold the wheel in a downward pointing opened position. The pin 131 can then be removed. The wheel sleeve rotated and then the second hole 135 in the wheel sleeve used with the pin 131 to hold the wheel in a folded or closed position. Accordingly, the wheel has two positions. The wheel rotates 90 degrees from its open to its closed position to move from the configuration shown for example in FIG. 1 to that shown for example in FIG. 6. Both rear wheels 20-1, 20-3 can be rotated 90 degrees about the base frame side rails to be either opened or closed.

Similarly the front wheel 20-2 is also mounted on a wheel sleeve 117 that has two holes 60-2, 62-2 that connect with a hole in the center rail and a pin 131 can be used to lock the front wheel either in the downward or sideways position. The front wheel can be rotated in either direction or in a single direction about the center rail depending on the implementation.

Figure 9:
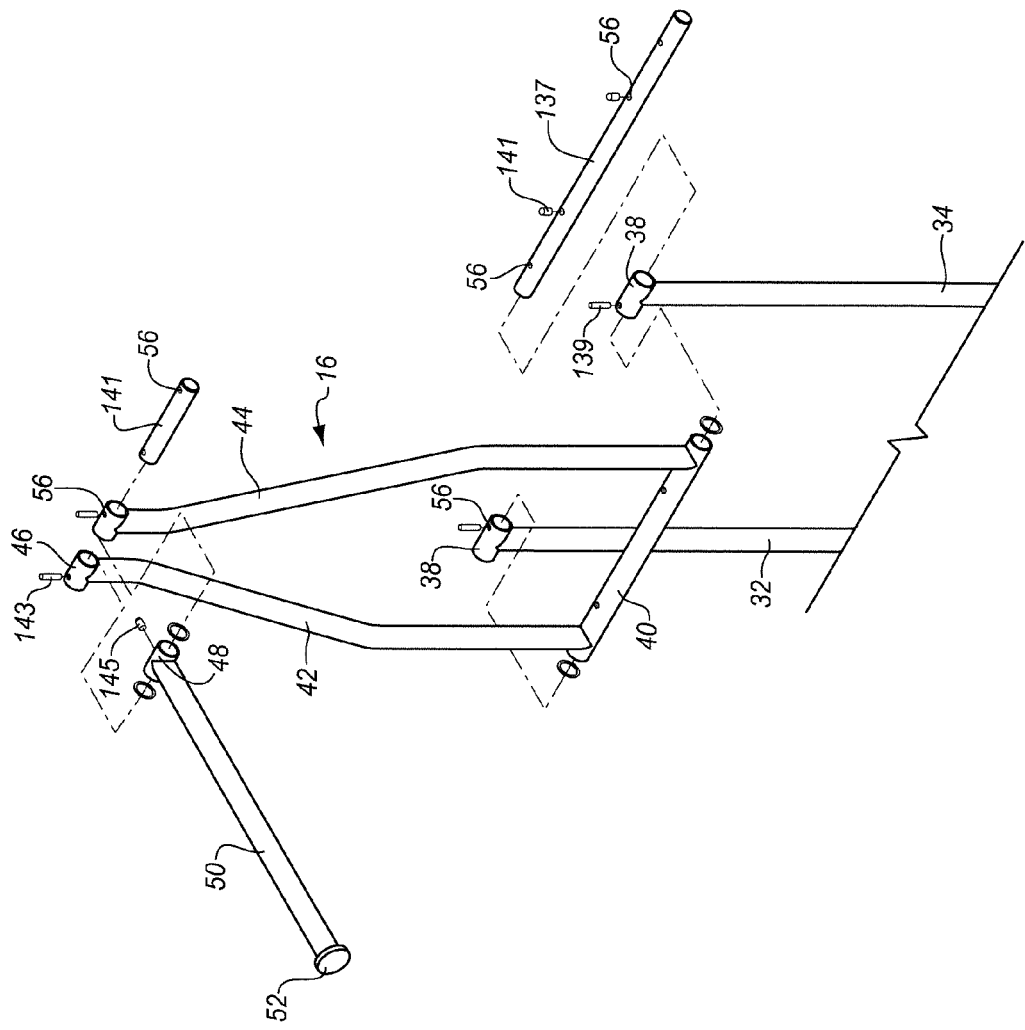
FIG. 9 shows an exploded perspective view of an upper portion of the valet cart of FIG. 2 according to an embodiment of the invention.

FIG. 9 shows how concentric tubing can be used for the upper vertical support frame and the hanger rod to allow those portions to be folded as well. The lower bar 40 of the upper vertical support frame 16 can encircle an inner tube 137 to hold the lower rail 40 of the upper support frame to the upper rail 38 of the lower support frame. As shown, the inner tube 137 can extend through both ends of the upper support frame of the upper rail of the lower support frame and the lower rail of the upper support frame to allow the upper support frame to pivot about the upper rail of the lower support frame.

A set of apertures or holes 56 are provided to connect, hold, or fasten the parts together. There is an outer pair of pins 139 to hold the inner tube to the lower support frame and a pair of inner pins 141 to hold the upper support frame to the inner tube. Either one of these pins may be fixed in position because only one pair of pins need be removed to allow the two support frame sections to pivot with respect to each other about the central tube 137. As an alternative, and as in all of the similar constructions described herein, a single pin may be used to hold either the upper support frame or the lower support frame with respect to the inner rod 137 to ease the locking and unlocking of the tube in its position. In the example of the two portions 14, 16 of the vertical support frame, the holes 56 through which the pins travel are rotated 180 degrees from the open position to the closed position. For this reason, only one pair of holes is necessary to fix the two portions of the vertical support frame in position.

The hanger rod can be pivotally connected to the top of the upper support frame in a similar fashion. In the illustrated example, at the back 48 of the hanger rod, an inner tube 141 extends through collars 46 that form the upper rail of the inner upper vertical frame and through the back end 48 of the hanger rod. Apertures 56 allow pins 143 to hold the inner tube 141 in place against the vertical frame. Further apertures (not shown) and another single pin 143 allows the position of the hanger rod to be locked with respect to the inner tube 141. Removing the central pin 145 or the outer pins 143 allows the hanger rod to be rotated from its outward horizontal position to a vertical position tucked within and between the two side rails 42, 44 of the upper vertical support frame.

The concentric tubing shown in FIGS. 8 and 9 allows a very strong connection that takes very little space between all of the components of the luggage cart. Each of the pieces can be pivotally rotated about inner tubes from open to close positions and no external hinges are required.

Figure 10A:
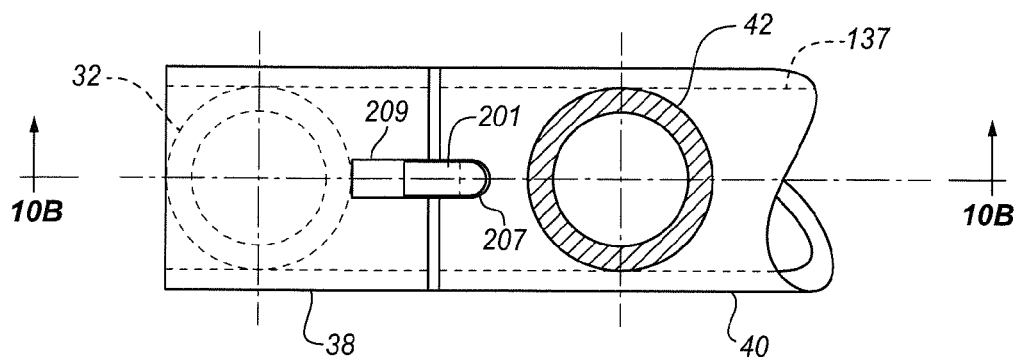
FIG. 10A shows a cross-section view of an alternative locking mechanism of the upper vertical support frame according to an embodiment of the invention.

FIG. 10A shows an alternative to the lock pins described in the examples of FIGS. 8 and 9. In FIG. 10A, the lower rail 40 of the upper vertical support frame is held to the upper rail 38 of the lower vertical support frame by the concentric inner tube 137. The inner tube is locked in place onto the upper rail of the lower vertical support frame by a pin 213 (see FIG. 10B), however, this attachment can be made using rivets, welding adhesives, or in any of a variety of other ways.

The locking pin 213 holds a latching block 215 within the top rail 38 of the lower support frame. This block includes a slide plate 201 with a finger notch 203 held within the latching block by a spring 217. The slide plate fits into a groove 207 in the lower rail 40 of the upper vertical frame. Upon pulling on the finger notch 203 away from the lower rail 40. The lower rail is released to pivot about the inner tube 137 and the upper rail 38 of the lower vertical frame. If the upper vertical frame is rotated 180 degrees, then a second notch 211 is rotated into position in front of the slide plate 201. The slide plate can then be moved into the second notch 211 to again hold the upper vertical frame in place.

When pulled away from the lower bar 40, the slide plate is pulled into a second groove 209 in the upper rail 38 of the lower vertical frame. This allows the lower rail of the upper vertical frame to be rotated without interference from the slide plate 201. A leaf spring 217 built into the block pushes the slide plate against the notches 207, 211. To hold the slide plate in the locked position and to lock the upper and lower portions of the vertical frame in position with respect to each other. This slide plate can be adapted for use with any of the rotating parts of the present invention.

Figure 10B:
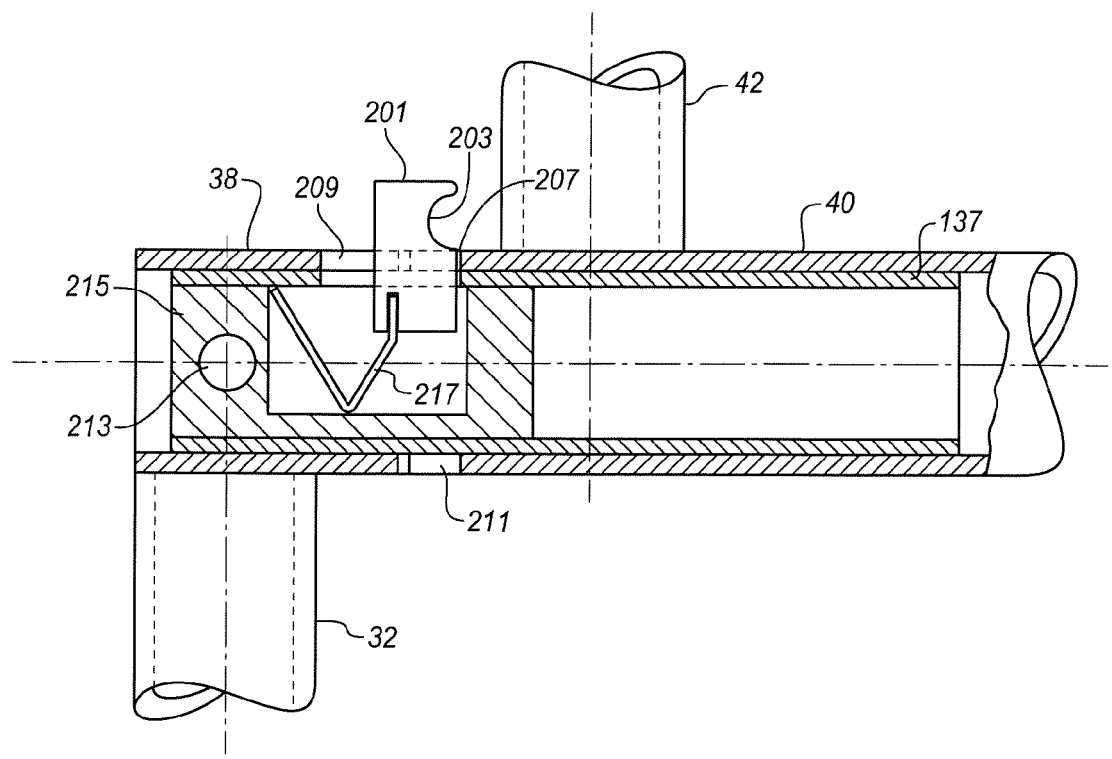
FIG. 10B shows a cross-section view taken along line 10B-10B of FIG. 10A of the alternative locking mechanism of FIG. 10A.

FIG. 10B shows a top plane view of the mechanism of FIG. 10A. FIG. 10B shows that the slide plate 201 moves between the two slots 207, 209, one in the lower rail 40 and the other in the upper rail 38. A similar slide plate mechanism can be used, for example, also for the hanger rod, for the connection between the vertical support frame and the base frame, as well as for each of the wheels.

Figure 11A:
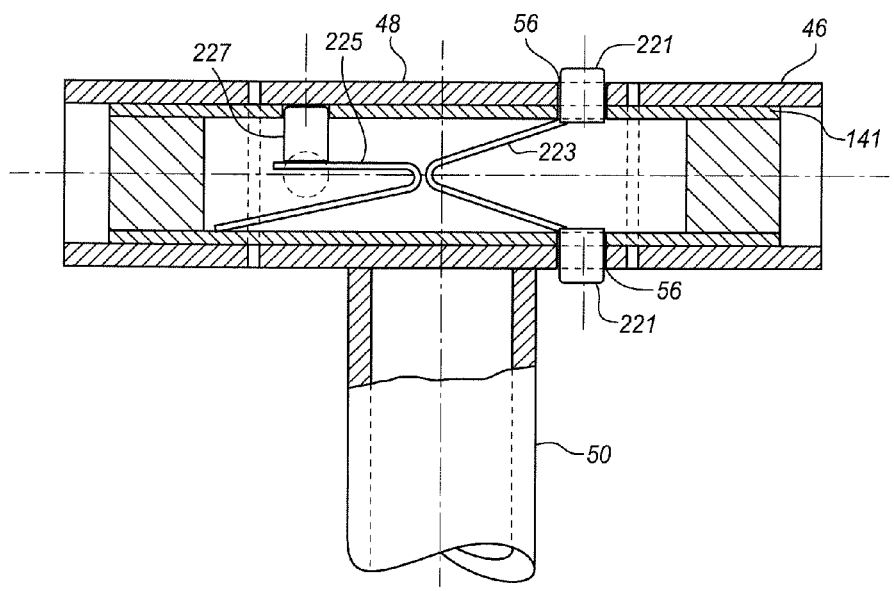
FIG. 11A shows a cross section view of an alternative locking mechanism of the hanger rod according to an embodiment of the invention.
Figure 11B:
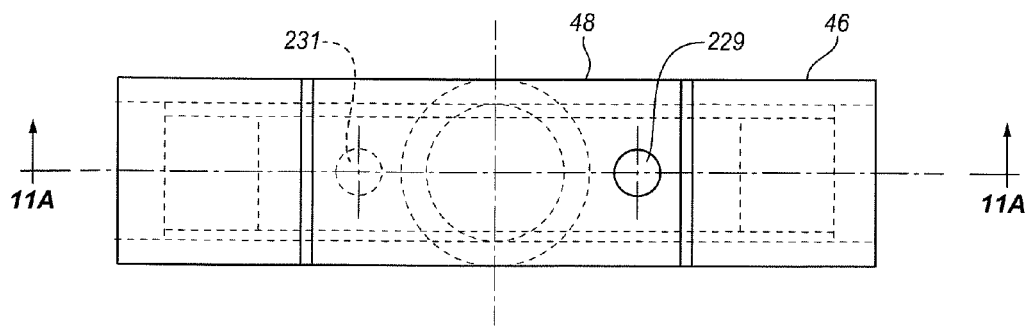
FIG. 11B shows a cross-section view taken along line 11B-11B of FIG. 11A of the alternative locking mechanism of FIG. 11A.

FIG. 11A shows another alternative example of a locking pin which can be used, like the example of FIGS. 10A and 10B, in any of the moving portions of the luggage cart 10. In FIG. 11A, a leaf spring 223, 225 loaded pair of pins is shown to hold the hanger rod 18 in place. The pins can be pressed by hand into the tubing and are pressed outward though the tubing by the spring. Typically, a light thumb pressure will suffice. The horizontal rail 50 of the hanger rod is attached to the hanger rod end 48. An inner sleeve 141 extends through the upper rail 46 of the upper vertical support frame and the rear 48 of the hanger rod. As shown for example in FIGS. 2 and 3, the hanger is designed in those embodiments to rotate 90 degrees about the top rail of the upper vertical support frame. To do this using pins there are two pairs of apertures 90 degrees apart from each other in the inner tube 141 and the rear 48 of the hanger rod.

As shown in FIG. 11A, a pair of pins 221 are attached to a leaf spring 223. The leaf spring is inside the inner tube and pushes the two pins attached at either end of the leaf spring outwards out of the inner tube and through the rear 48 of the hanger rod. In the example, the pins extend through apertures 56 in both the inner tube and the rear of the hanger rod, in order to hold the hanger rod in position. To unlock the hanger rod, a user can press the two pins inward until they clear the back 48 of the hanger rod. The hanger rod can then be rotated to another position. As the hanger rod is rotated and nears 90 degrees from its initial position, a new pair of apertures in the rear of the hanger rod 48 will align with the two pins 221. The leaf spring 223 will press the pins out through these apertures 56 to again lock the hanger rod in the new rotated position.

As an alternative and as shown in FIG. 11A, a second leaf spring 225 inside the inner tube is fastened to a second pin 227. The first set of pins 221 extend through holes 229 on the rear of the hanger rod to lock the hanger rod in the extended position able to carry clothes or garment bags or other items fully supported by the rod. At another point on the rear of the hanger rod there is another aperture 231 which is lined up with another aperture in the inner tube 141. When the hanger rod is rotated 90 degrees into the closed position as shown for example in FIG. 4, the second pin 227 will be driven by its leaf spring 225 through the alternative hole 231. In this way, one set of pins 221 lock the hanger rod in the open position and another pin 227 locks the hanger rod in the closed position. A single pin is sufficient for holding a hanger rod in the closed position because in the closed position it is not expected to support as much force or weight as in the open position. Such a thumb compressible leaf sprung pin configuration can be used for any of the other pivotal connections such as between the upper and lower frame, between the vertical support frame and the base frame and between the handle and the base frame.

Figure 12:
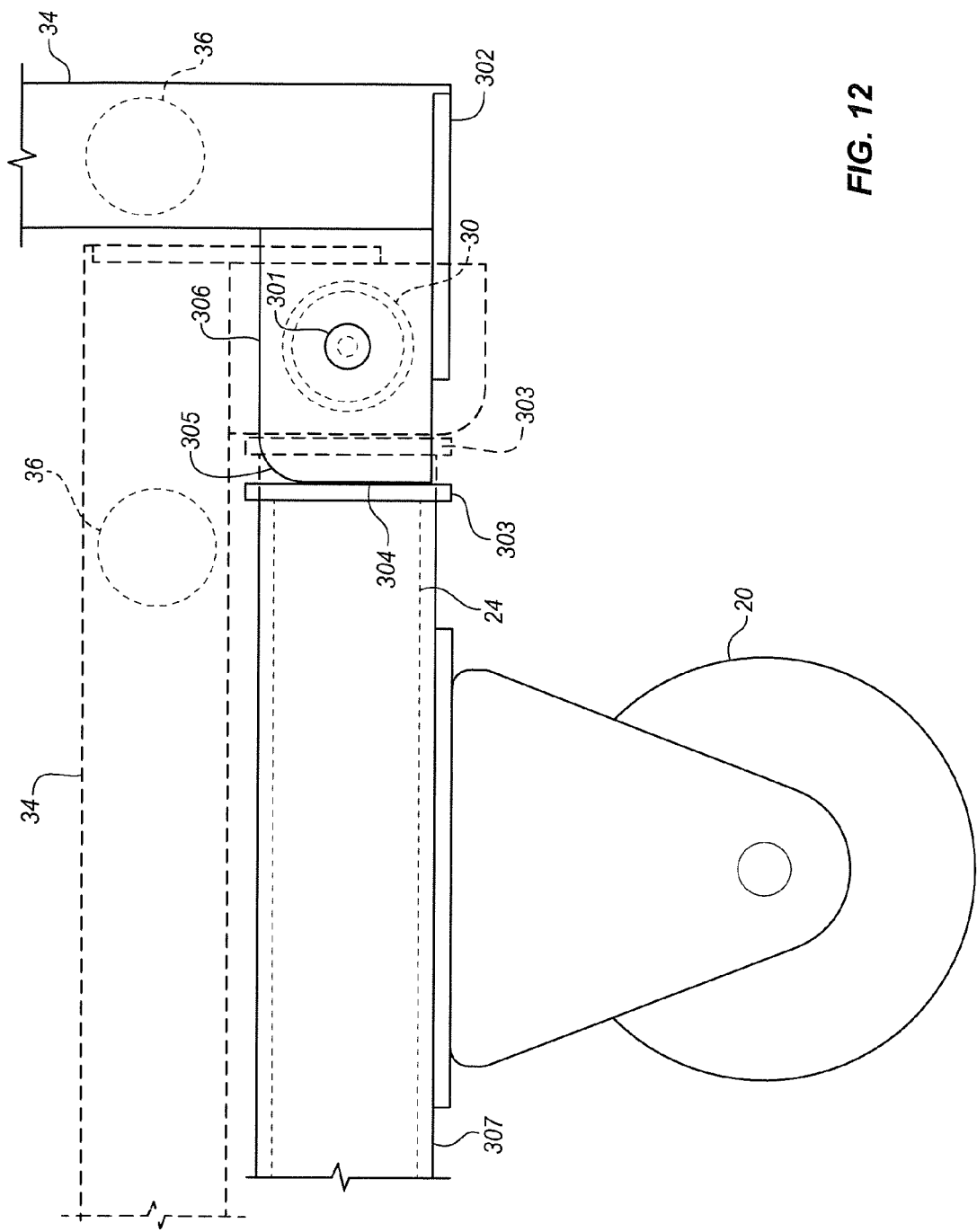
FIG. 12 shows a side elevation and partially cut-away view of an alternative configuration for operating the wheels and for folding the vertical support frame of a valet cart in a folded position according to an embodiment of the invention.

FIG. 12 is an elevation and partially cut-away view of an alternative configuration for operating the wheels and for folding the vertical support frame. In the example of FIG. 12, the side rail 24 of the base frame 12 carries a wheel 20. However, the wheel is designed to rotate 90 degrees to be either unfolded and deployed or folded and tucked within the base frame by rotating the vertical support frame about its pivot point. In particular, pushing the vertical support frame's horizontal handle bar 40 will rotate the vertical support frame downward toward the base frame and the force of this pushing action will drive the wheels into the folded position at the same time. This eliminates the need for the user to manually operate each of the wheels. FIG. 12 shows one example of how the wheels may be automatically folded and unfolded in a simple motion, however, other configurations may also be used.

In FIG. 12, the vertical support frame 34 is shown in an open unfolded position in solid line and in a closed or folded position in dotted line. The outer side rail 34 of the lower vertical support frame 14 is shown in an elevation view and the lower bottom rail 36 is shown as a dotted line for reference purposes only. The outer side rail is connected to a lower bracket 302 which is attached by a pivot pin 301 to the rear rail 30 of the base frame 12. The side rail of the vertical support frame along with the rest of the vertical support frame rotates about the connecting pin 301 from the vertical position shown in solid line to the horizontal position shown in dotted line.

When the vertical support frame is rotated from the horizontal position to the vertical position, the upper edge 306 which was formerly holding a flange 303 has moved away and the flange is pushed out away from the pivot pin 301 by a chamfered edge 305 of the bracket 302. When the vertical support frame reaches the vertical position, as shown in solid line, the flange 303 rests against a vertical surface 304 of the support bracket 302. This pushes the flange 303 to the left as shown in the drawing away from the pivot pin 301. This can be done by designing the horizontal surface 306 to be closer to the pivot point 301 than the vertical surface 304. The amount by which the flange is moved can be determined by the selection of these distances.

Similarly when the vertical support frame is rotated to the horizontal position, the support bracket rotates about the pivot pin 301 allowing the flange to come closer to the pivot pin as shown in dotted line. As a result of the support bracket and the flange moving, the vertical support frame pushes the flange to the left or the right as shown in FIG. 12. The flange is attached to an outer wheel sleeve 307 so that the outer wheel sleeve and the wheel, which is attached to it, both move left and right or toward and away from the pivot point and the vertical support frame bracket.

Figure 13:
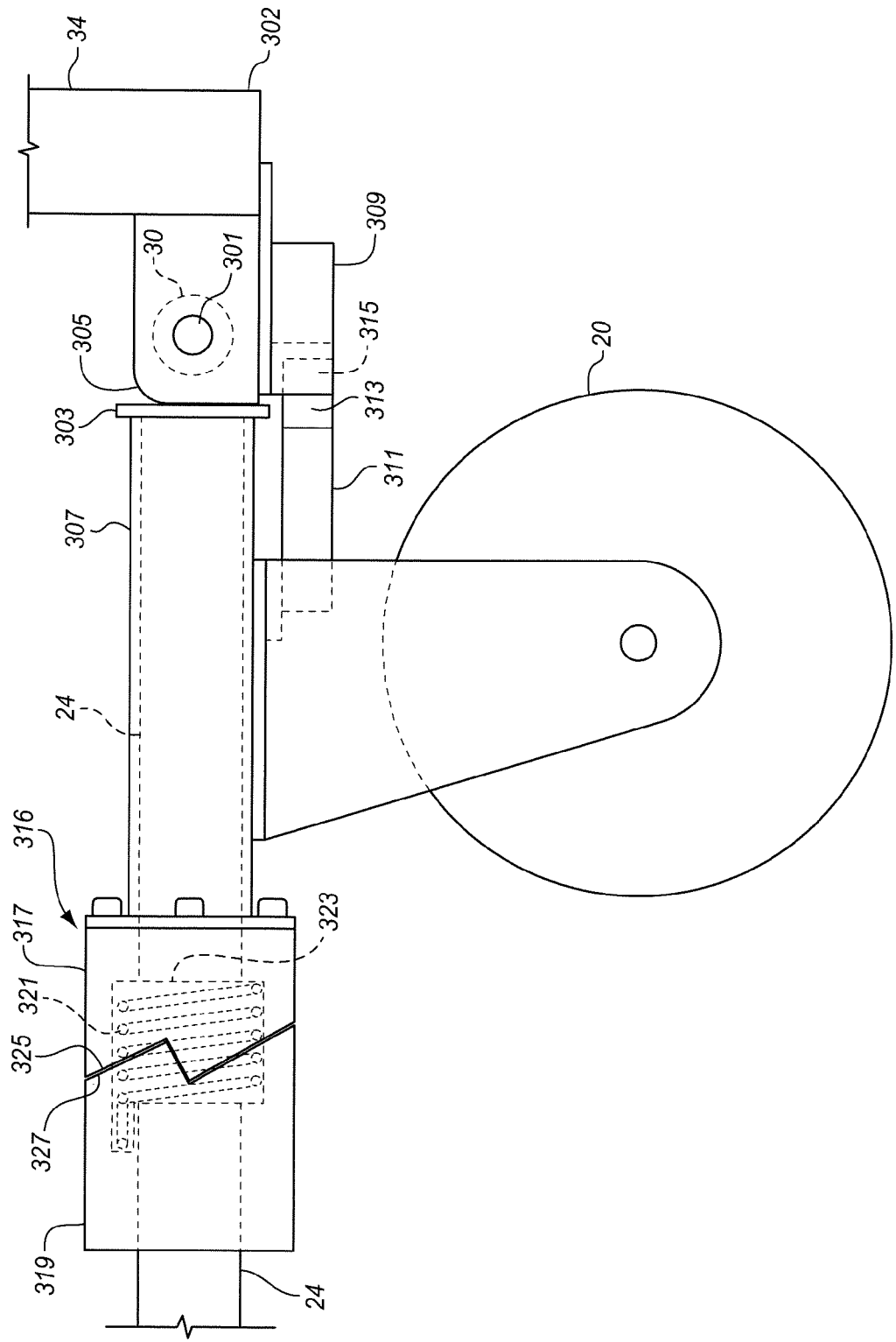
FIG. 13 shows a side elevation and partially cut-away view of the alternative configuration of FIG. 12 for operating the wheels and for folding the vertical support frame of a valet cart in an unfolded position according to an embodiment of the invention.

FIG. 13, shows an example of how this left, right motion can be converted into a rotation of the wheel bracket 90 degrees about the side rail 24. This 90 degree rotation moves the wheel 20 from being tucked up within the base frame to being pushed downwards so that the cart can be rolled. As shown in FIG. 13, movement of the flange 303 moves the outside of the side rail 24 against a mechanical actuator 316. The mechanical actuator has a first angle body 317 attached to the side rail 24 and a second angle body 319 attached to a continuation of the side rail 207. As shown in dotted line, a fixed part of the side rail 307 extends within the outer part of the side rail 24. The two concentric tubes form a part of the base frame and provide a rigid structure for it. The outside of the side rail 24 can then rotate with the wheel 20 based on the movement of the flange 303.

In the mechanical actuator there is an inner chamber 323 which holds a coil spring 321. The spring pushes the rotating body 317 against the support bracket 302 of the vertical support frame. Accordingly, when the vertical support frame is rotated to the horizontal position, as shown in FIG. 12, the flange 303 will be pushed by the coil spring 321 toward the vertical support frame. When the user moves the vertical support frame back to the vertical position, the user must push against the coil spring 321 to move the flange 303 toward the left as shown in the figures. In addition, the rotating angle body 317 and the fixed angle body 319 connect through angled surfaces 325, 327. These angled surfaces engage and slide against one another while the support frame is rotated to drive the wheel 20 to rotate about the fixed part 207 of the side rail 24.

The wheel 20 is mounted using a bracket 311 to the outside collar 307 for the side rail 24. Since the outside collar 307 is forced to rotate by the angled surfaces 325, 327, when the flange 303 is moved toward or away from the vertical support frame, the wheel rotates with the outside collar 307. The mounting bracket 311 rotates with the wheel. This mounting bracket includes a tab 313 which is shaped to engage into a groove 315 in a locking bracket 309. The locking bracket is attached to the bottom of the vertical support frame bracket 302.

As the user pushes the vertical support frame down, the locking bracket 309 rotates with the support bracket 302 to pull the groove 315 away from the tab releasing the wheel to rotate. When the vertical support frame is moved back to the vertical position and the wheel 20 is rotated into the deployed position, the tab 313 on the wheel bracket 311 will be moved downwards below the side rail 304 which will then allow it to line up with the locking bracket's groove. The tab and groove lock the wheel into position more firmly than the spring and angled surfaces of the actuator mechanism 316. As a result, the wheel is held firmly into place in the deployed position but allowed to be released by the same action of the user that rotates the wheel.

Figure 14:
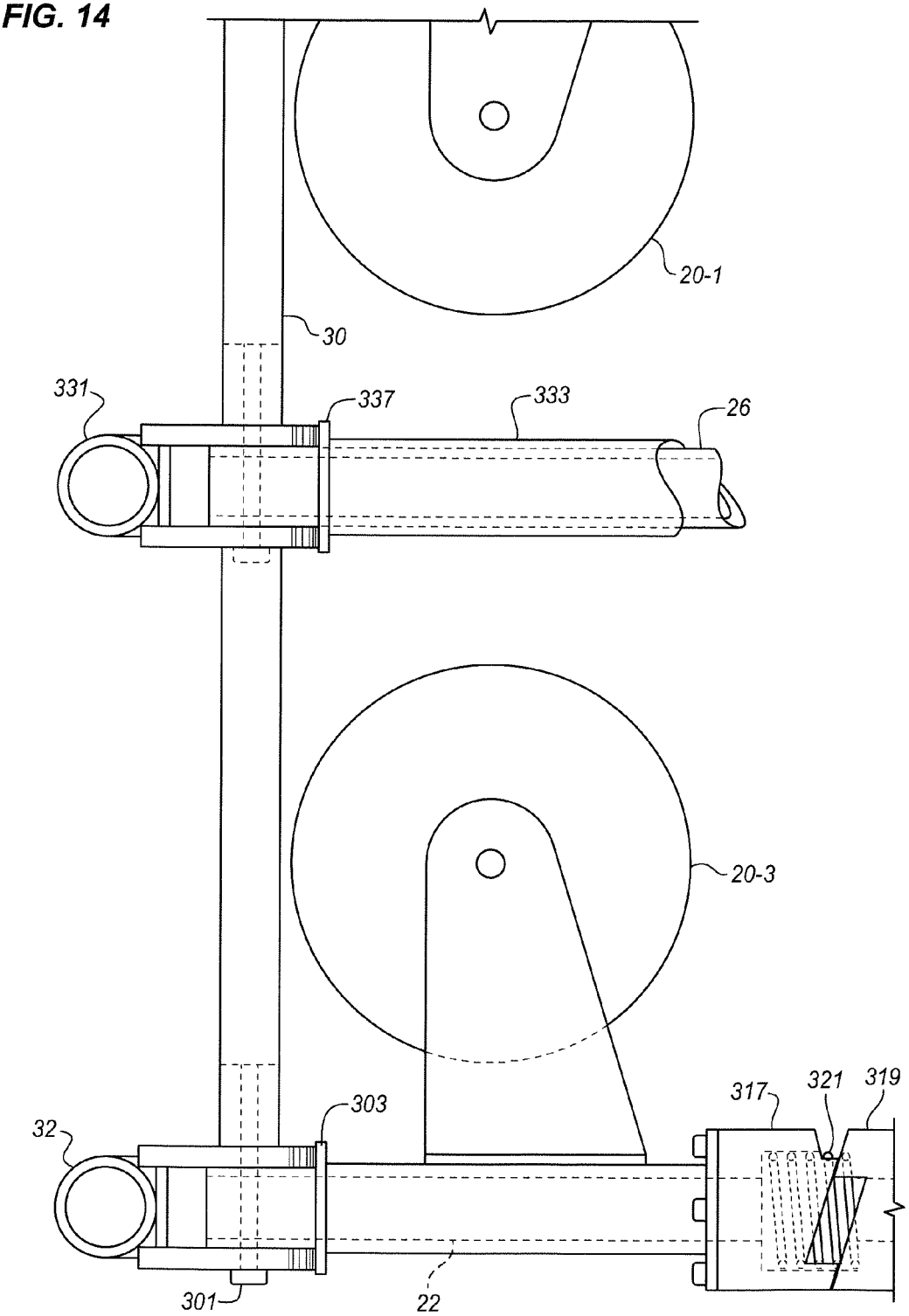
FIG. 14 shows a top elevation and partially cut-away view of the alternative configuration of FIG. 12 for operating the wheels and for folding the vertical support frame of a valet cart in a folded position according to an embodiment of the invention.

FIG. 14 shows that all three of the wheels shown for example in FIG. 1 can be operated at one time by rotating the vertical support frame about the pivot point 301. In FIG. 3, the same side rail with the rotation actuator is shown as in FIG. 14. For the center wheel mounted to the center rail 26, the same type of actuator can be used but activated across a longer distance to reach the front of the cart. In the example of FIG. 14, a similar flange 337 is used as that shown on FIG. 12. The flange 337 pushes on an outer sleeve 333, to drive a mechanical actuator (not shown) similar to that of FIGS. 12 and 13.

Since the front wheel 20-2 is at a further distance from the back rail 30 of the cart, the sleeve 333 will be much longer. However, the same type of actuator body can be used. In order to drive the flange 337, an additional rail may be provided in the lower vertical support frame with a bracket and specifically spaced edges about a pivot pin as shown in FIG. 12. Alternatively, instead of a full rail similar to the side rails 32 and 34, the support bracket of FIGS. 12 and 13 may be used without a rail. The flange is driven entirely by a support bracket 302 at the base of the vertical support frame. A similar support bracket without a vertical rail can be attached so that the bottom horizontal rail 36 operates the flange 337 as shown in the context of FIGS. 12 and 13. Locking tabs and grooves can be also used to operate to hold the wheel in position from a distance.

In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail but are nonetheless encompassed within the scope of the invention.

Reference throughout this specification to "an example," "one embodiment," or "an embodiment" means that a particular feature, structure, or characteristic described in connection with the embodiment is included in at least one embodiment of the present invention. Thus, appearances of such phrases in this specification do not necessarily all refer to the same embodiment. Furthermore, the particular features, structures, or characteristics may be combined in any suitable manner in one or more embodiments.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A foldable cart comprising:
   a base frame;
   a plurality of wheels coupled to the base frame;
   a lower vertical support frame having two ends, a first end being pivotally connected to the base frame to fold against the base frame in a closed position and to extend to a vertical position against the base frame in an open position to form a back wall of the cart;
   an upper vertical support frame having two ends, a first end being pivotally connected to the second end of the lower vertical support frame that is opposite the base frame first end so that the upper vertical support frame folds against the lower vertical support frame in the closed position, the second end having a top rail; and
   a hanger rod having two ends, a first end being pivotally connected to the top rail at the second end of the upper vertical support frame opposite the first end of the upper vertical support frame so that the hanger rod rotates about the top rail to fold against the upper vertical support frame in a folded position and to extend outward horizontally over the base frame from the pivotal connection of the top rail of the upper vertical support frame in an extended position;
   wherein the upper vertical support frame is narrower at the second end than at the first end and the hanger rod extends from the center of the top rail so that when the hanger rod is folded into the upper vertical support frame and the upper vertical support frame is folded into the lower vertical support frame with the lower vertical support frame in the open position, then the upper vertical support frame and the hanger rod form additional surface areas on the back wall of the cart.

2. The foldable cart of claim 1, wherein the hanger rod has a folded position parallel with and encompassed by vertical side rails of the upper vertical support frame, the folded position being 90 degrees from the extended position.

3. The foldable cart of claim 1, wherein the hanger rod is formed from a single rod connected at the pivotal connection to the upper vertical support frame, the single rod rotatable to extend over the base frame in the extended position to carry items fully supported by the rod.

4. The foldable cart of claim 1, wherein the lower vertical support frame second end has a top rail which extends to a position away from the base frame, wherein the upper vertical support frame is coupled to the top rail lower vertical support frame, the top rail having hand grips for pushing the cart.

5. The foldable cart of claim 1, wherein the wheels are pivotally mounted to fold against the base frame.

6. The foldable cart of claim 1, wherein in a folded position the base frame forms a first layer and the hanger rod, upper vertical support frame, and lower vertical support frame combined form a second layer above and parallel to the first layer.

7. The foldable cart of claim 1, further comprising a handle pivotally connected to the base frame opposite the lower vertical support frame to fold against the base frame.

8. The foldable cart of claim 7, wherein the handle has a folded position against the folded upper and lower vertical support frames.

9. The foldable cart of claim 1, wherein the pivotal connection of the upper vertical support frame to the lower vertical support frame comprises two concentric tubes, one tube within the other tube, one tube being a part of the upper vertical support frame and the other tube being a part of the lower vertical support frame.

10. The foldable cart of claim 9, wherein the concentric tubes form a horizontal bar having a hand grip for pushing the cart.

11. The foldable cart of claim 9, further comprising pins extending through holes in the concentric tubes to lock the upper vertical support frame in an unfolded position with respect to the lower vertical support frame.

12. The foldable cart of claim 11, wherein the pins are coupled to a spring to push the pins toward the holes.

13. The foldable cart of claim 9, further comprising a slide plate to engage a groove in at least one of the concentric tubes to hold the tube in an unfolded position.

14. The foldable cart of claim 13, wherein the slide plate engages a notch in the at least one concentric tube and includes a finger notch for engaging and disengaging the slide plate in the groove.

15. The foldable cart of claim 5, further comprising an actuator between the wheels and the lower vertical support frame to fold against the base frame when the lower vertical support frame is folded against the base frame.

16. The foldable cart of claim 5, wherein the actuator comprises angled surfaces connected to the wheels and configured to rotate with movement of the lower vertical support frame.

* * * * *